(12) United States Patent
Wang et al.

(10) Patent No.: US 8,537,763 B2
(45) Date of Patent: Sep. 17, 2013

(54) FRAME ALLOCATION TO SUPPORT LEGACY WIRELESS COMMUNICATION PROTOCOLS ON UPLINK TRANSMISSION

(75) Inventors: Fan Wang, Chicago, IL (US); Mark C. Cudak, Rolling Meadows, IL (US); Amitabha Ghosh, Buffalo Grove, IL (US); Tzu-Chung F. Hsieh, Hoffman Estates, IL (US); Bishwarup Mondal, Oak Park, IL (US)

(73) Assignee: Motorola Mobility LLC, Libertyville, IL (US)

( * ) Notice: Subject to any disclaimer, the term of this patent is extended or adjusted under 35 U.S.C. 154(b) by 442 days.

(21) Appl. No.: 12/487,171

(22) Filed: Jun. 18, 2009

(65) Prior Publication Data

US 2009/0323614 A1 Dec. 31, 2009

(51) Int. Cl.
*H04W 4/00* (2009.01)
*H04J 3/16* (2006.01)

(52) U.S. Cl.
USPC .......................................... 370/329; 370/465

(58) Field of Classification Search
None
See application file for complete search history.

(56) References Cited

U.S. PATENT DOCUMENTS

| | | | |
|---|---|---|---|
| 2006/0092892 A1 | 5/2006 | Trachewsky | |
| 2006/0203935 A1* | 9/2006 | Li et al. | 375/299 |
| 2009/0180410 A1* | 7/2009 | Lee et al. | 370/294 |
| 2010/0111226 A1* | 5/2010 | Ko et al. | 375/299 |
| 2010/0260164 A1* | 10/2010 | Moon et al. | 370/345 |
| 2011/0019622 A1* | 1/2011 | Lee et al. | 370/328 |
| 2011/0211510 A1* | 9/2011 | Kim et al. | 370/311 |

FOREIGN PATENT DOCUMENTS

KR 1020080041520 A 5/2008

OTHER PUBLICATIONS

Park, Jeongho et al.: Proposed UL Symbol and Pilot Structure for 802.16m, IEEE 802.16 Presentation Template (Rev.9), IEEE C802.16m-08/283r1, May 5, 2008, pp. 1-31.
Vrzic, Sophie et al.: Proposal for IEEE 802.16m UL Resource Blocks and Channelization, IEEE C802.16m-08/350r1, May 12, 2008, pp. 1-10.
Xi, Xin et al.: Proposal for IEEE 802.16m Uplink PHY Structure with Legacy Support, IEEE C802.16m-08/394r1, May 5, 2008, all pages.
Mo-Han Fong, et al.: "Proposal for IEEE 802.16m Frame Structure and Protocol Architecture for Multi-band Operation", IEEE 802.16 Broadband Wireless Access Working Group, Jan. 10, 2008, pp. 1-6.
Cudak, Mark et al.: "Proposed Frame Structure for IEEE 802.16m", IEEE 802.16 Broadband Wireless Access Working Group, Jan. 16, 2008, IEEE, Piscataway, NJ, USA, all pages.
Koorapaty, H: "Backward Compatible Use of Larger Bandwidths for 802.16m", IEEE C802.16M-07/249R1,URL: http://www.ieee802.org/16/tgm/contrib/C80216m-06_249r1.doc, [Online] Jan. 16, 2008, pp. 1-7.
Kipo'S Notice of Preliminary Rejection (English Translation), Feb. 27, 2012, all pages.

* cited by examiner

*Primary Examiner* — Eunsook Choi

(57) ABSTRACT

A frame (200) and a method for allocating resources that is used in a wireless communication network is provided. The frame includes a first subframe (202) concatenated to a second subframe (204). A first portion (206) of the first subframe allocated for a control channel of a first protocol. A second portion (208) of the first subframe and the second subframe are allocated for a data channel for the first protocol. In an embodiment second portion of the first subframe and the second subframe are allocated for a data channel of the second protocol that are multiplexed with the data channel of the first protocol using frequency division multiplexing (FDM).

15 Claims, 5 Drawing Sheets

FRAME ALLOCATION TO SUPPORT LEGACY WIRELESS COMMUNICATION PROTOCOLS ON UPLINK TRANSMISSION

FIELD OF THE INVENTION

The present invention relates generally to wireless communications and, in particular, to allocating frames and subframes to support legacy protocols in an advanced protocol on uplink channels.

BACKGROUND

Evolutionary wireless communication systems should be able to support legacy system equipment. The IEEE 802.16 (m) protocol is an evolution of the WiMax OFDMA specification for IEEE 802.16(e) protocol. Thus, some 802.16(e) equipment, e.g. base stations and mobile stations, will coexist with 802.16(m) equipment as equipment for the 802.16(m) protocol is being deployed and used. As the base stations and mobile stations for these different protocols are being used together, the frame structures for the newer advanced protocol need to support the frame structure for the legacy protocols.

The legacy 802.16(e) protocol includes two modes for subchannelization, or allocating physical resources for transmission. One mode is Partial Usage of Subchannels (PUSC). In the UL 802.16(e) protocol, the minimum resource allocation unit for PUSC is 4 contiguous subcarriers by 3 OFDM symbols. This minimum unit is commonly known as a tile. One resource allocation may contain multiple tiles that are spread across the whole frequency band. Another mode of subchannelization is Band Adaptive Modulation and Coding (Band-AMC). The minimum resource allocation unit of Band-AMC is a bin, or 9 contiguous subcarriers by 1 OFDM symbol. One resource allocation in Band-AMC may contain multiple bins and across 3 contiguous OFDM symbols. In the legacy 802.16(e) protocol, control channel can only be transmitted using PUSC mode, while data channels can be transmitted using either PUSC or Band-AMC mode. As proposed for 802.16 (m), the minimum building block consists of 6 or 9, or multiples of 6 or 9 contiguous subcarriers.

The need to support legacy 802.16(e) systems in 802.16(m) can lead to complex system design. As noted above, the tile size of PUSC mode of the 802.16(e) and 802.16(m) are not identical and are not multiples of one another. If both tile sizes are supported for 802.16(m) data channels, it can lead to increased complexity for 802.16(m) mobile stations. What is needed therefore is a frame structure and method that will support the legacy 802.16(e) protocol in 802.16(m) without increasing the complexity of 802.16(m) system.

The various aspects, features and advantages of the disclosure will become more fully apparent to those having ordinary skill in the art upon careful consideration of the following Detailed Description with the accompanying drawings. The drawings may have been simplified for clarity and are not drawn to scale.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
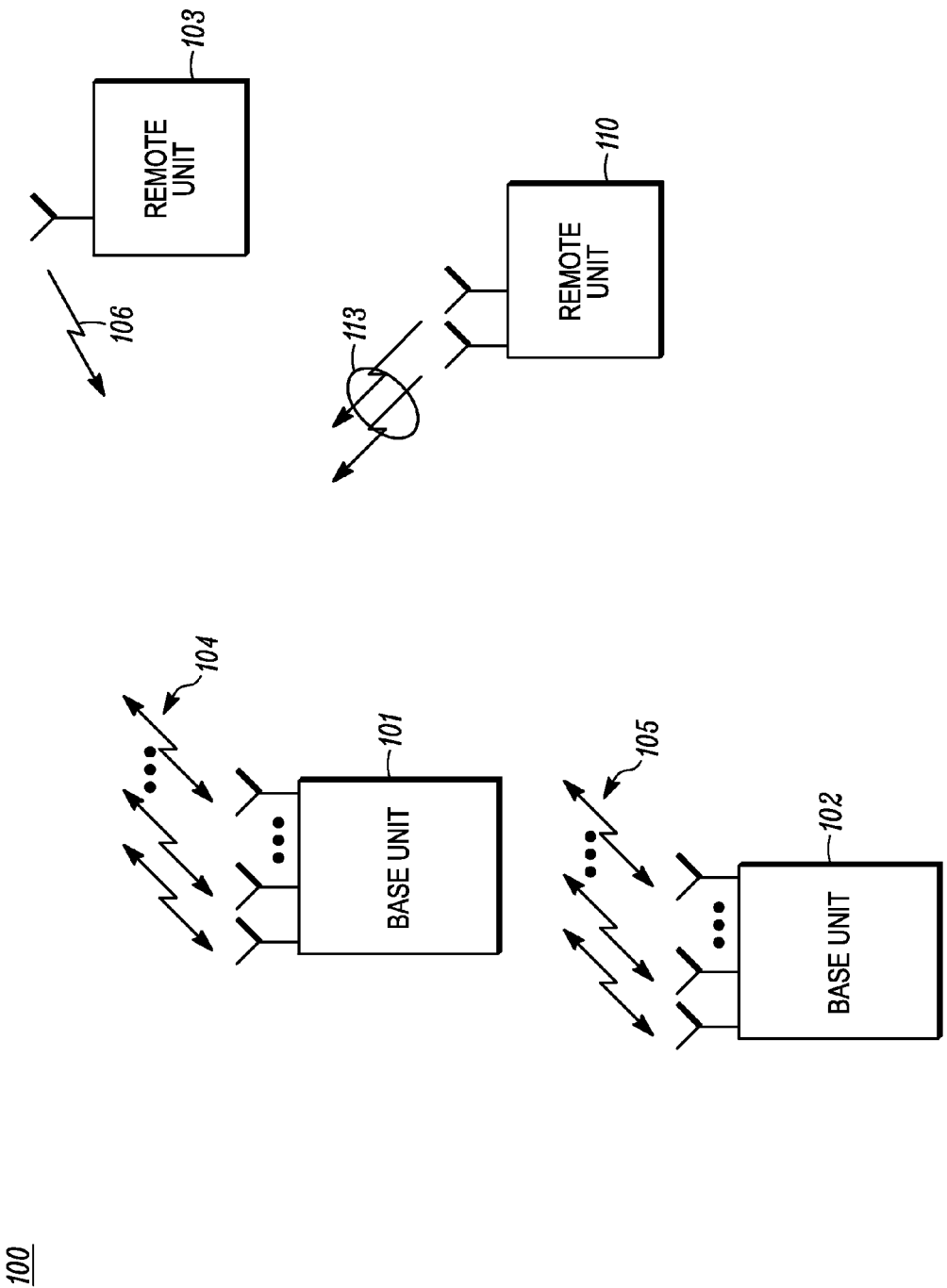
FIG. 1 is an example a wireless communication system in which some embodiments of the invention can be embodied.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to method of frame allocation and a frame used to support legacy protocols on the uplink channel. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of frame structure used to support legacy wireless communication protocols on the uplink channel described herein. The non-processor circuits may include, but are not limited to, a radio receiver, a radio transmitter, signal drivers, clock circuits, power source circuits, and user input devices. As such, these functions may be interpreted as steps of a method to perform frame allocation to support legacy wireless communication protocol support on the uplink channel. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In an embodiment, the present invention is related to a frame used for control and data channels in a wireless communication network. The frame is allocated so that it can transmit control and data messages in an advanced protocol as well as the legacy protocol, e.g. 802.16(m) and 802.16(e), respectively. The frame includes a first subframe concatenated to a second subframe. The first subframe is divided into a first segment or portion and a second segment or portion. The first and second portions can be the same size. Each subframe can include six symbols so that the first and second portions are three symbols each.

The first portion of the first subframe is allocated for control channels for the legacy protocol such as PUSC mode of 802.16(e) protocol. The second portion of the first subframe and the second subframe are allocated for data channels for the legacy protocol such as Band-AMC mode of 802.16(e) protocol. In addition, the second portion of the first subframe and the second subframe can also be allocated for data channels for the legacy protocol that are being multiplexed with channels for the advanced protocol such as the 802.16(m) protocol using frequency division multiplexing (FDM). This same segment of the frame can be multiplexed with control channels for the advanced protocol. The first portion may also include control channels of the advanced protocol.

In another embodiment of the present invention, a method is provided for use in the advanced wireless communication network protocol to support the legacy protocol. The method includes allocating resources in a frame that is compliant with the legacy protocol and the advanced protocol, which can be 802.16(e) and 802.16(m) protocols, respectively. The frame includes a first subframe that is concatenated to a second subframe. Moreover, the first subframe includes a first portion and a second portion. The portions are configured so that the second portion of the first subframe is concatenated to the second subframe.

The method also includes allocating resources for use as control channels for the legacy protocol to the first portion of the first subframe and allocating resources for use as data channels for the legacy protocol to the second portion of the first subframe and the second subframe wherein the second portion of the first subframe being concatenated to the second subframe. The data channels for the legacy protocol uses Band-AMC subchannelization. In an embodiment, the method also includes allocating resources for use as channels for the advanced protocol to the second portion of the first subframe and the second subframe. The method can also allocate control channels for the advanced protocol to the second portion of the first subframe and the second subframe as well as the first portion of the first subframe. In the second portion of the first subframe and the second subframe, the data channels for the legacy protocol and the channels for the advanced protocol co-exist using FDM.

Turning to FIG. 1, a wireless communication network 100 is shown. The network 100 includes one or more fixed base infrastructure units forming a network distributed over a geographical region. The fixed base infrastructure units can be base units or base stations 101, 102, which can be referred to as an access point, access terminal, Node-B, eNode-B or by other terminology used in the art. The base stations 101-102 serve a number of remote units that can be mobile stations 103, 104 within the base station's serving area, for example, a cell or within a cell sector. The mobile stations may be fixed or terminal and may be referred to as subscriber units, users, terminals, subscriber stations, user equipment (UE), terminals, subscriber stations, user equipment (UE), terminals and other things.

Generally, base stations 101, 102 transmit downlink communications signals 104, 105 to the mobile stations on at least a portion of the resources, e.g. time and frequency, allocated for such communications. Mobile stations 103, 104 communicate with one or more of the base stations 101, 102 via uplink communication channels 106, 113. The base stations and mobile stations can each include one or more transmitters or receivers. In one embodiment, the wireless communication network 100 utilizes OFDMA or a next generation single-carrier (SC) bases FDMA architecture for uplink transmissions. One such OFDMA-based protocol is IEEE 802.16(m). Another OFDMA-based protocol is IEEE 802.16(e). As mentioned before, the uplink transmissions should also be able to support IEEE 802.16(e) protocols.

The wireless communication network may implement more than one communication technology as is typical of systems upgraded with newer technology. In FIG. 1, for example, one or more of the mobile stations may be legacy technology mobile stations like IEEE 802.16(e) protocol mobile stations while other mobile stations may be new or advanced generation technologies such as IEEE 802.16(m) protocol mobile stations. In these cases, it is generally desirable for the new technologies to be backward compatible with the legacy technology. For the evolution of 802.16(e) the backward compatibility constraint implies that the legacy control channel using PUSC mode must be supported by the 802.16(m) base stations. Additionally, to efficiently support control and data messages, 802.16(m) base stations should be able to service both 802.16(m) mobile stations and legacy mobile stations within a common frame structure.

Regarding frame structure, it is generally necessary to design frames that can support transmission of control and data channels for the both advanced protocol and the legacy protocol. Thus, to accommodate backwards compatibility in 802.16(m), it is necessary to develop a frame and subframe structure based on legacy 802.16(e) frames. In order to support control and data channels for 802.16(e), the 802.16(m) frames need to be able to support the PUSC control uplink channels and Band-AMC data uplink channels for the legacy protocol. The resource allocated for PUSC control uplink messages of legacy 802.16(e) are spread across the whole frequency band in the unit of a tile, which consists of 4 contiguous subcarriers by 3 symbols. The Band-AMC data uplink channel contains multiple bins across 3 OFDM symbols where each bin contains 9 subcarriers by 1 OFDM symbol. At the same time the frame structure for 802.16(m) consists of building blocks which have 6 or 9, or multiple of 6 or 9 contiguous subcarriers.

To support uplink legacy 802.16(e) PUSC control symbols and Band-AMC data symbols with the 802.16(m) frame, each of the different configurations of tiles and bins will need to be considered. If the advanced protocol 802.16(m) needs to coexist with the legacy 802.16 (e) PUSC mode, the tile size of 802.16(m) would have to be 4 subcarriers by 6 OFDM symbols. First, it cannot coexist with the other tile size of 802.16 (m). In addition, the small tile containing 4 subcarriers requires more pilot overhead than the tile of 802.16(m). Because of the need to support multiple tile sizes, the mobile station also needs to be more complex in its design and functionality to support both the 802.16(m) protocol and legacy protocols.

It is possible to use time division multiplexing (TDM) to support the 802.16(e) protocol and the legacy PUSC subchannels. At the same time, support must be provided for the frequency division multiplexing of 802.16(m) and legacy Band-AMC. Interlacing 802.16(e) and 802.16(m) sub-frames may also be applied to support the legacy PUSC mode in 802.16(m).

Figure 2:
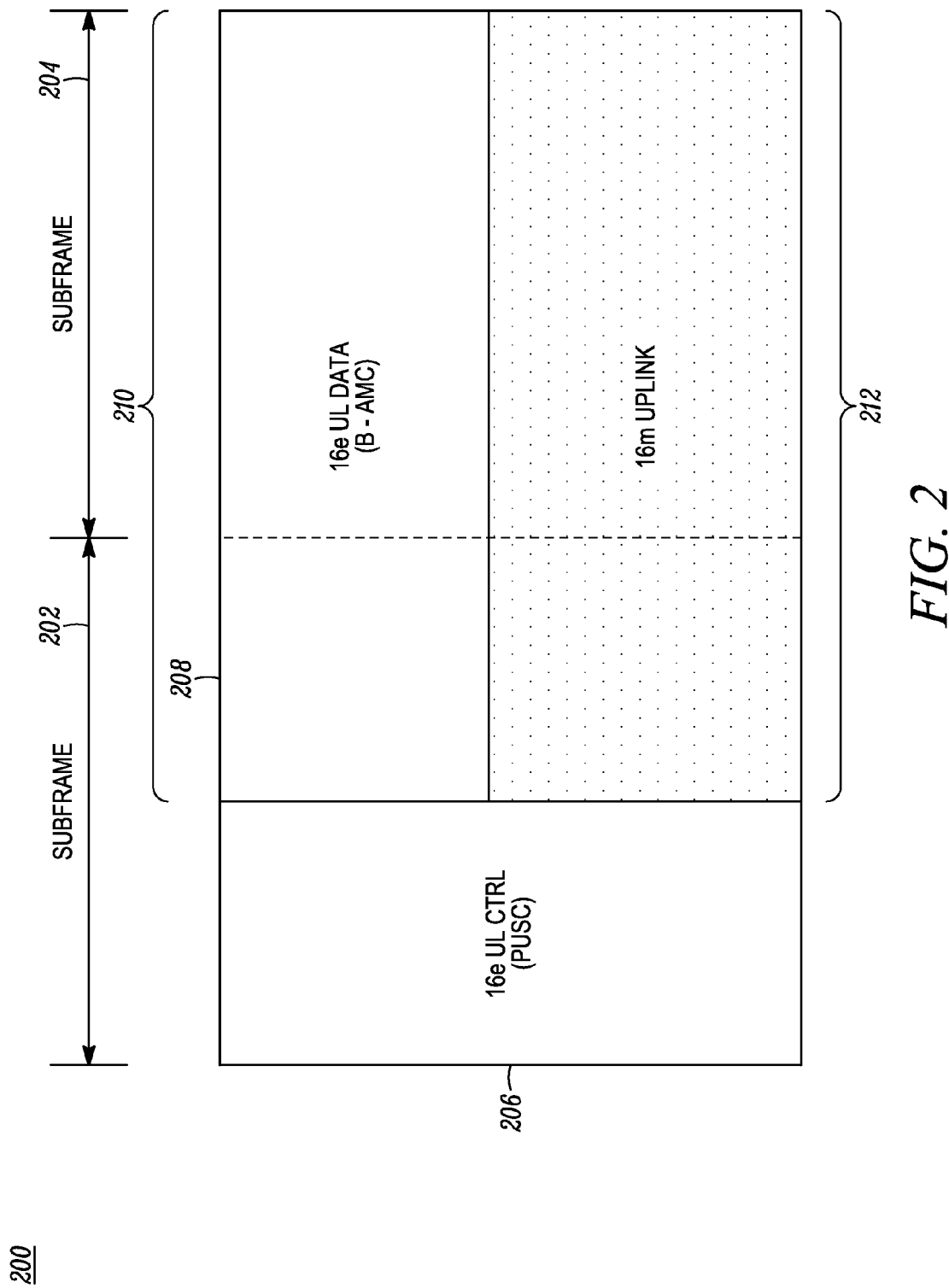
FIG. 2 is a frame structure configuration for a 802.16(m) frame in accordance with an embodiment of the present invention.

Turning to FIG. 2, a frame structure 200 according to an embodiment of the present invention is shown that takes into considerations the constraints and objectives listed above. The frame structure 200 supports both the 802.16(m) OFDM requirements and the legacy 802.16(e) protocol requirements. In particular, frame structure 200 supports the legacy PUSC uplink control channel, the legacy uplink Band-AMC data channel and also support the 802.16(m) uplink control and data channels.

In FIG. 2, frame structure includes two subframes 202 and 204. These subframes 202 and 204 are concatenated together, i.e. are linked side-by-side to one another, to form the frame structure 200. Subframes 202 and 204 are concatenated together such that the allocation for 802.16(m) at least spans 6 OFDM symbols. The concatenated subframes 202, 204 are arranged so that the frame structure 200 can support the legacy PUSC uplink control channel, the legacy uplink Band-AMC data channel and the 802.16(m) uplink channels.

To accommodate the legacy PUSC uplink control channel and the legacy uplink Band-AMC data channel, the first subframe 202 is configured with at least two portions or segments 206 and 208. Portion 206 is configured to support the legacy PUSC uplink control channel and, therefore, consists of tiles of 4 subcarriers by 3 symbols. With this configuration of first portion 206, second portion 208 can be used for legacy Band-AMC. The 3 symbols of second portion 208 are concatenated with the 6 symbols of the second subframe 204 to form segment 210. This combination of symbols is a sufficient size to support the uplink Band-AMC data channel. In addition, the 3 symbols of the second portion 208 concatenated with the 6 symbols of the seconds subframe 204 can form segment 212 and is sufficient to support the 802.16(m) uplink frame structure. The 802.16(m) uplink channel is multiplexed with the legacy uplink Band-AMC data channel in the segment 210 using FDM.

Figure 3:
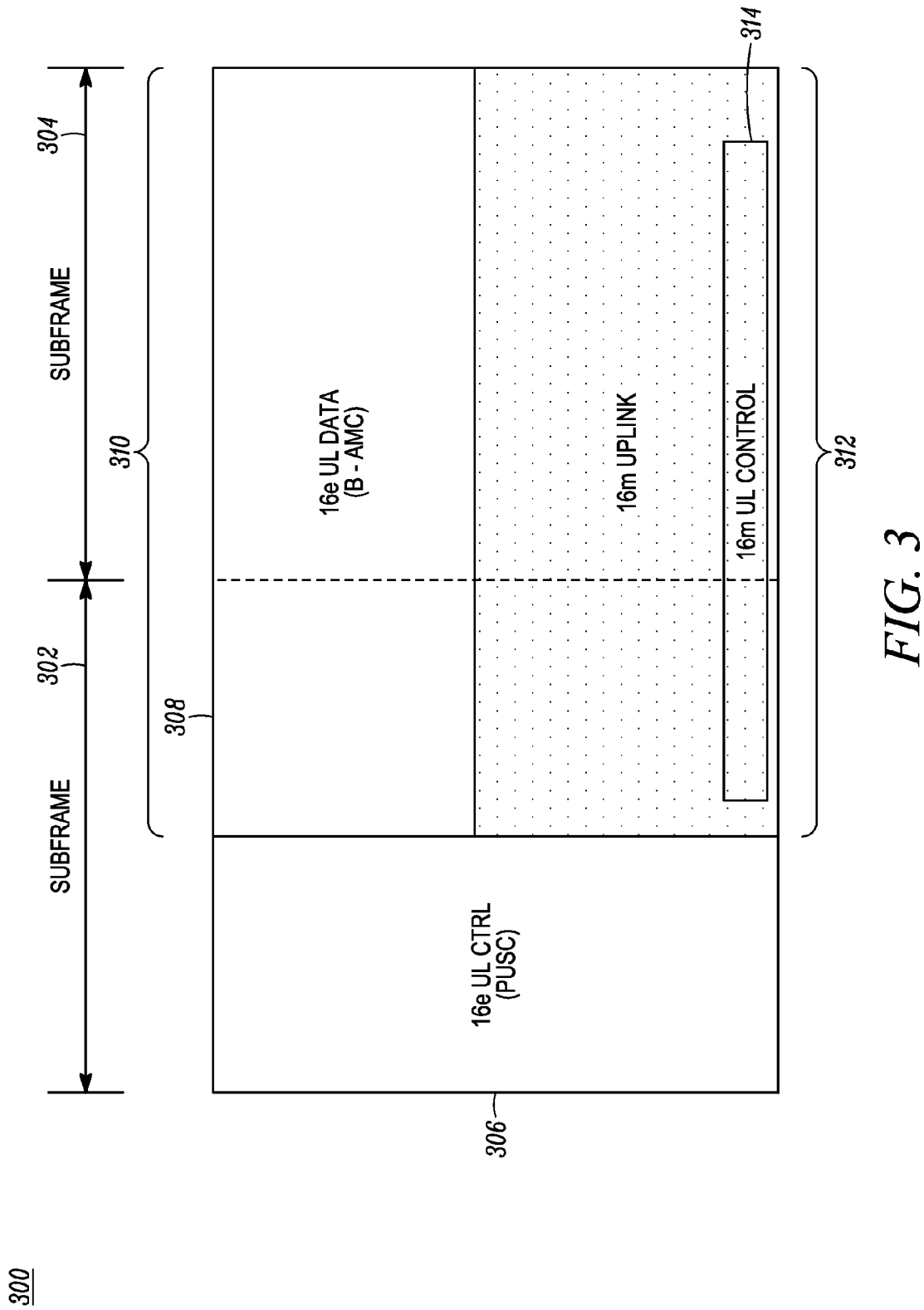
FIG. 3 is a frame structure configuration including uplink control information in accordance with another embodiment of the present invention.

The frame structure 200 does not describe how to accommodate the 802.16(m) uplink control channel that are sent between the mobile stations 106, 108 and the base stations 102, 104. FIG. 3 illustrates frame structure 300 that includes this channel. Like frame 200, frame structure 300 includes first subframe 302 concatenated to second subframe 304. Subframe 302 includes a first portion 306 and second portion 308. The first portion 306 is configured so that 802.16(e) PUSC control channel can be allocated to this position. The second portion 308 is concatenated to the second subframe 304 to form segment 310 so that Band-AMC uplink data can be allocated to this portion of the frame. In addition, the 802.16(m) uplink data channel is multiplexed with the legacy Band-AMC data using FDM. The uplink control channels for the 802.16(m) are allocated to a segment 314 that is a part of the segment 312.

Figure 4:
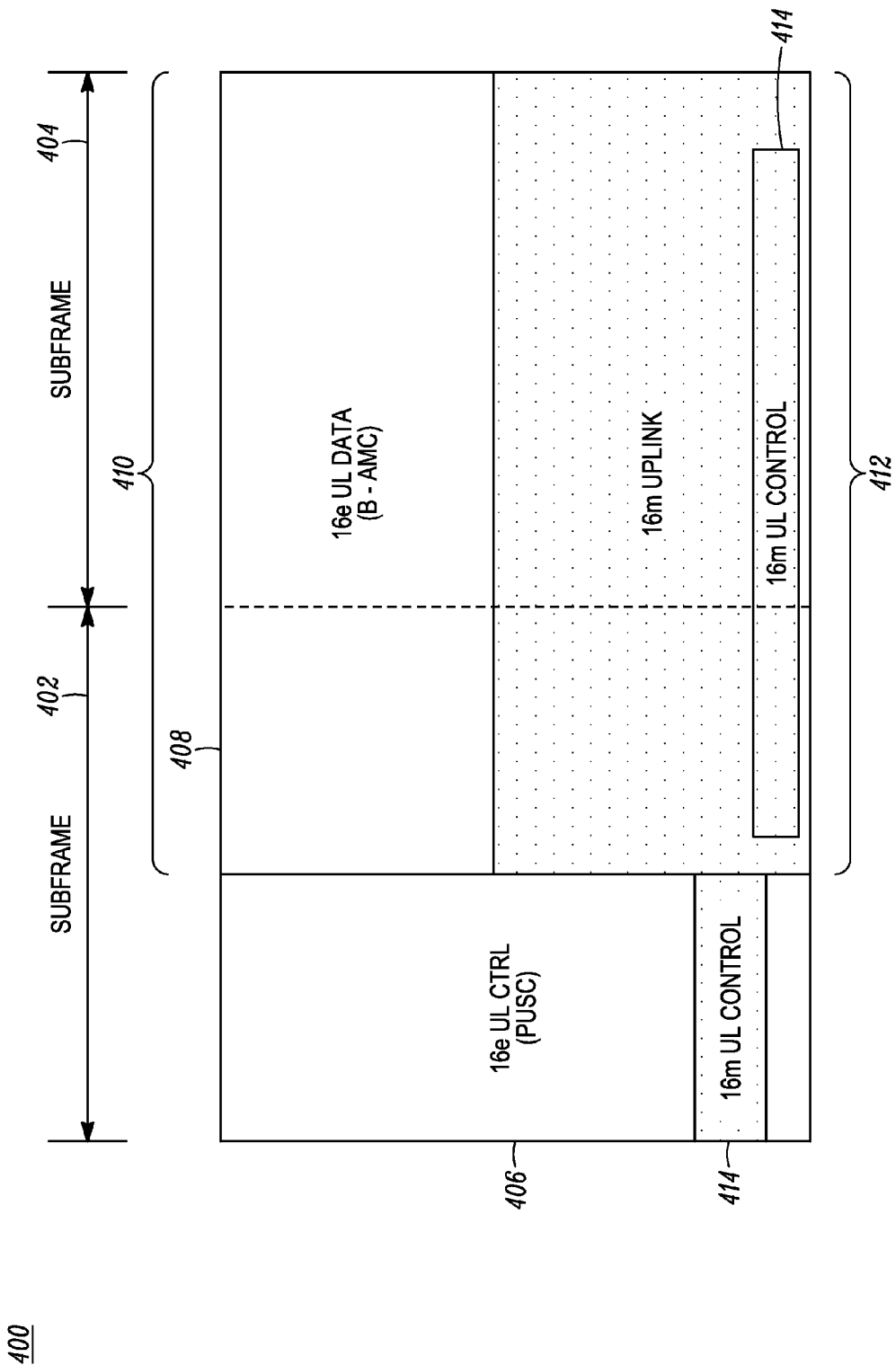
FIG. 4 is a frame structure configuration including another configuration of uplink control information.

FIG. 4 illustrates an alternative frame structure 400 to frame structure 300 that also accommodates the 802.16 uplink control signals. Frame structure 400 includes first subframe 402 concatenated to second subframe 404 where first subframe has a first portion 406 and second portion 408. The first portion 406 is for PUSC uplink control signals as defined by 802.16(e), and the second portion 408 is concatenated to the second subframe to form segments 410, 412 so that legacy Band-AMC uplink data can be multiplexed with the 802.16(m) uplink channel using FDM. As is understood, the legacy PUSC uplink control channel does not actively use all of the various subcarriers provided in the channel. Moreover, as the use of the advanced protocol increases over the legacy protocol, the number of mobile stations configured for 802.16(e) protocols will reduce so that there will be less reliance on the first portion to be used for legacy PUSC control channel. Thus, at least one subcarrier in the first portion can be used as channel or segment 414 for the uplink control channel in 802.16(m). As with FIG. 3, at lest one subcarrier of the uplink data channel for 802.16 (m) can be used for uplink control channel 414.

As is understood from the above description, a tile containing 6 or 9, or multiples of 6 or 9 contiguous subcarriers in frequency and 3 OFDM symbols are recommended for the 802.16(m) protocol. Channel estimation can be improved by allocating two tiles concatenated in time. In another embodiment, channel estimation can be improved by allocating two tiles concatenated in frequency; frequency diversity can be achieved by allocating another two tiles concatenated in time and with frequency offset from the first two tiles. Thus, the smallest unit for data allocation in 802.16(m) contains of at least 6 contiguous OFDM symbols. With a legacy protocol, the minimum uplink allocation is 2 subframes as the 802.16 (e) profile requires at least 12 uplink OFDM symbols. This can be accommodated by the first 3 OFDM symbols be allocated for legacy uplink control using PUSC. Moreover, a legacy subframe 202, 302, 402 is concatenated with the next subframe 204, 304, 404. The allocation of channels allows for the mixture of legacy PUSC control channel and legacy Band-AMC data channels to be allocated across the concatenated subframes. In addition, the 802.16(m) data channels can be multiplexed with the legacy channels. Moreover, the 802.16 (m) control channels can be allocated across the 802.16(m) data channels and the legacy PUSC control channels.

Figure 5:
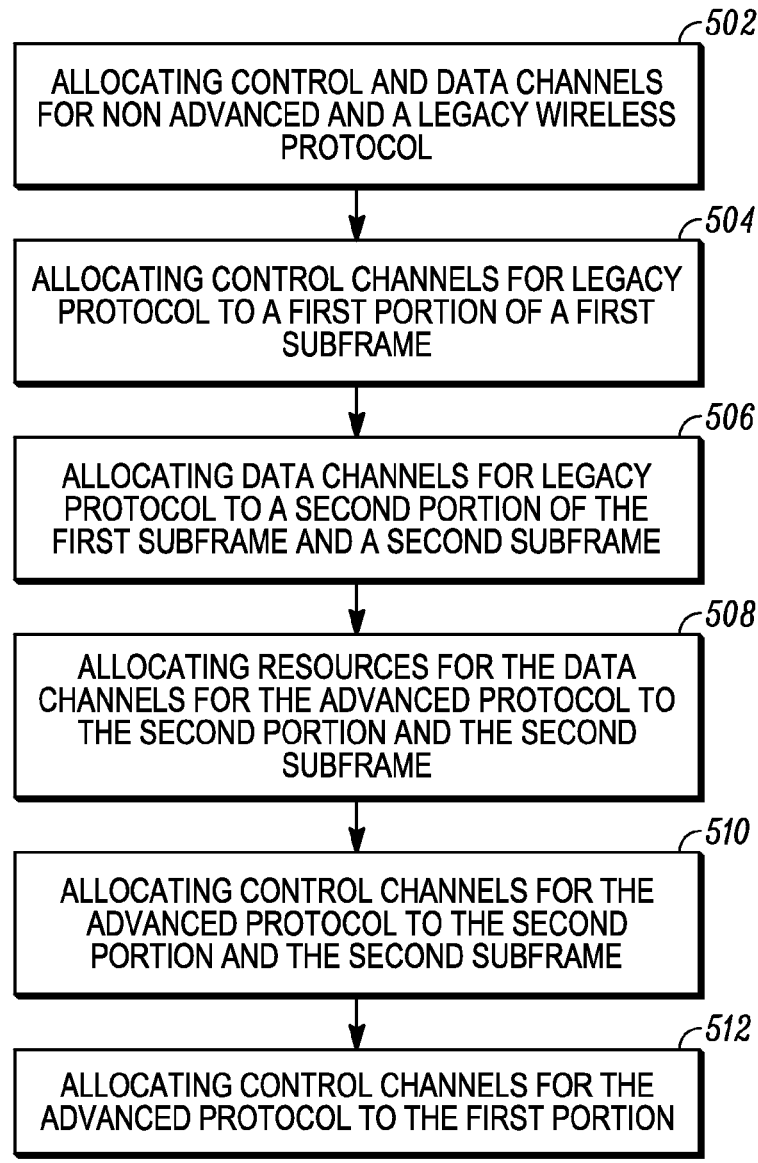
FIG. 5 is a flow chart illustrating a method of allocating resources into a frame structure for channels accommodating advanced and legacy protocols.

Turning to FIG. 5 and flow chart 500 is shown that illustrates the allocation of subcarriers and symbols across subframes 202, 302, 402, 204, 304, 404. The allocation of subcarriers and symbols permits an advanced protocol, e.g. 802.16(m), to accommodate a legacy protocol, e.g. 802.16(e). The process begins by allocating 502 resources such as control channels and data channels that are compliant with both the advanced and the legacy protocol. The frame includes a first subframe that is concatenated with a second subframe. The first subframe is further configured to have a first segment or portion and a second segment of portion. The process continues by allocating 504 control channels that are used with the legacy protocol into the first portion of the first subframe. In addition, the process includes allocating 506 data channels that are used in the legacy protocol into the second portion of the first subframe and the second subframe, which are concatenated to one another.

In an embodiment, the process includes allocating resources that are used for channels of the advanced protocol. This process includes allocating 508 data channels for the advance protocol into the second portion of the first subframe and second subframe. Control channels of the advanced protocol can be allocated 510 at the second portion of the first subframe and second subframe as well. Moreover, the control channels can be allocated 512 into the first portion of the first subframe when resources are available in that region.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A frame transmitted by a base station in a wireless communication network, the frame comprising:
   a first subframe concatenated to a second subframe;
   a first portion of the first subframe including resources for control channels of a legacy protocol;
   a second portion of the first subframe and the second subframe including resources for data channels for the legacy protocol,
   wherein the resources in the second portion of the first subframe and the second subframe allocated for data channels for the legacy protocol are multiplexed with the allocated resources for channels for an advanced protocol.

2. The frame of claim 1 wherein the channels for the legacy protocol being multiplexed with the allocated resources for channels for the advanced protocol using frequency division multiplexing (FDM).

3. The frame of claim 1 wherein channels for the advanced protocol include control channels for the advanced protocol.

4. The frame of claim 1 wherein the allocated resources for control channels for the legacy protocol being multiplexed with the resources for control channels for the advanced protocol in the first portion of the first subframe using frequency division multiplexing (FDM).

5. The frame of claim 1 wherein the advanced protocol is an 802.16(m) wireless communication protocol.

6. The frame of claim 1 wherein the legacy protocol is an 802.16(e) wireless communication protocol.

7. The frame of claim 1 wherein the control channels allocated to the first portion being partial usage of subchannels (PUSC) of the legacy protocol.

8. The frame of claim 1 wherein the data channels allocated to the second portion of the first subframe and the second subframe being band adaptive modulation and coding (Band-AMC) of the legacy protocol.

9. The frame of claim 1 wherein the first subframe and the second subframe has six symbols and the first portion and the second portion are each three symbols.

10. The frame of claim 1 wherein the second portion of the first subframe and the second subframe are concatenated in time to form a segment with nine symbols.

11. A method in an advanced protocol wireless communication network, the method comprising:
    allocating resources in a frame compliant with a legacy protocol and the advanced protocol wherein the frame including a first subframe concatenated to a second subframe and the first subframe having a first portion and a second portion;
    allocating resources for use as control channels for the legacy protocol to the first portion,
    allocating resources for use as data channels for the legacy protocol to the second portion of the first subframe and the second subframe wherein the second portion of the first subframe being concatenated to the second subframe; and
    multiplexing resources for data channels for the legacy protocol with resources for channels for the advanced protocol in the second portion of the first subframe and the second subframe.

12. The method of claim 11 wherein multiplexing resources uses frequency division multiplexing.

13. The method of claim 11 wherein channels for the advanced protocol further comprising control channels for the advanced protocol.

14. The method of claim 11 further comprising multiplexing resources for control channels for the legacy protocol with resources for control channels for the advanced protocol in the first portion of the first subframe using frequency division multiplexing.

15. The method of claim 14 further comprising multiplexing resources for data channels for the legacy protocol with resources for control channels for the advanced protocol in the second portion of the first subframe and the second subframe using frequency division multiplexing.

* * * * *